United States Patent
Smithson et al.

(10) Patent No.: US 11,623,324 B2
(45) Date of Patent: Apr. 11, 2023

(54) POLYMER BOND ABRASIVE ARTICLES AND METHODS OF MAKING THEM

(71) Applicant: 3M INNOVATIVE PROPERTIES COMPANY, St. Paul, MN (US)

(72) Inventors: Robert L. W. Smithson, Mahtomedi, MN (US); Brian D. Goers, Minneapolis, MN (US); Brian A. Shukla, Maplewood, MN (US); Michael C. Harper, Hudson, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 961 days.

(21) Appl. No.: 16/467,132

(22) PCT Filed: Dec. 13, 2017

(86) PCT No.: PCT/US2017/066042
§ 371 (c)(1),
(2) Date: Jun. 6, 2019

(87) PCT Pub. No.: WO2018/118566
PCT Pub. Date: Jun. 28, 2018

(65) Prior Publication Data
US 2020/0070311 A1   Mar. 5, 2020

Related U.S. Application Data

(60) Provisional application No. 62/438,875, filed on Dec. 23, 2016.

(51) Int. Cl.
*B24D 3/20* (2006.01)
*B24D 5/10* (2006.01)
*B24D 18/00* (2006.01)

(52) U.S. Cl.
CPC ............. *B24D 3/20* (2013.01); *B24D 5/10* (2013.01); *B24D 18/0072* (2013.01)

(58) Field of Classification Search
CPC ........ B24D 18/0072; B24D 5/10; B24D 3/20; B24D 3/00
See application file for complete search history.

(56) References Cited

U.S. PATENT DOCUMENTS 2,242,877 A * 5/1941 Albertson ................ B24D 7/02
451/527
3,609,925 A   10/1971 Comella-Riera
(Continued)

FOREIGN PATENT DOCUMENTS

| CN | 102658528 | 8/2012 |
| CN | 102658528 | 9/2012 |

(Continued)

OTHER PUBLICATIONS

International Search Report for PCT International Application No. PCT/US2017/066042, dated Mar. 23, 2018, 7 pages.
(Continued)

*Primary Examiner* — Pegah Parvini
(74) *Attorney, Agent, or Firm* — Katherine M. Scholz; James A. Baker

(57) ABSTRACT

Methods of making polymer bond abrasive articles and their precursors using powder bed jetting are disclosed. Polymer bond abrasive articles prepared by the method include abrasive articles having arcuate or tortuous cooling channels, unitary structured abrasive discs, abrasive segments, shaped abrasive particles, and abrasive wheels.

18 Claims, 8 Drawing Sheets

(56) References Cited

U.S. PATENT DOCUMENTS

| | | |
|---|---|---|
| 4,314,827 A | 2/1982 | Leitheiser |
| 4,518,397 A | 5/1985 | Leitheiser |
| 4,623,364 A | 11/1986 | Cottringer |
| 4,744,802 A | 5/1988 | Schwabel |
| 4,770,671 A | 9/1988 | Monroe |
| 4,881,951 A | 11/1989 | Wood |
| 4,918,872 A | 4/1990 | Sato |
| 4,960,441 A | 10/1990 | Pellow |
| 5,011,508 A | 4/1991 | Wald |
| 5,060,424 A | 10/1991 | Sato |
| 5,090,968 A | 2/1992 | Pellow |
| 5,139,978 A | 8/1992 | Wood |
| 5,178,849 A | 1/1993 | Bauer |
| 5,201,916 A | 4/1993 | Berg |
| 5,204,055 A | 4/1993 | Sachs |
| 5,227,104 A | 7/1993 | Bauer |
| 5,318,604 A | 6/1994 | Gorsuch et al. |
| 5,340,656 A | 8/1994 | Sachs |
| 5,366,523 A | 11/1994 | Rowenhorst |
| 5,387,380 A | 2/1995 | Cima |
| 5,429,647 A | 7/1995 | Larmie |
| 5,498,269 A | 3/1996 | Larmie |
| 5,547,479 A | 8/1996 | Conwell |
| 5,551,963 A | 9/1996 | Larmie |
| 5,707,409 A | 1/1998 | Martin |
| 5,725,162 A | 3/1998 | Garg |
| 5,766,277 A | 6/1998 | DeVoe |
| 5,776,214 A | 7/1998 | Wood |
| 6,209,420 B1 | 4/2001 | Butcher |
| 6,354,362 B1 | 3/2002 | Smith |
| 6,376,590 B2 | 4/2002 | Kolb |
| 6,403,002 B1 | 6/2002 | van der Geest |
| 6,551,366 B1 | 4/2003 | D'Souza |
| 6,581,671 B2 | 6/2003 | Butcher |
| 6,797,023 B2 | 9/2004 | Gobain |
| 7,524,345 B2 | 4/2009 | Nevoret |
| 8,083,820 B2 | 12/2011 | Koilodge |
| 8,349,233 B2 | 1/2013 | Ederer |
| 2003/0150169 A1 | 8/2003 | Annen |
| 2006/0185255 A1 | 8/2006 | Nevoret |
| 2015/0065012 A1 | 3/2015 | McArdle |
| 2015/0069649 A1 | 3/2015 | Bai |
| 2015/0126099 A1 | 5/2015 | Krishnan |
| 2016/0107295 A1 | 4/2016 | Bajaj |

FOREIGN PATENT DOCUMENTS

| | | | |
|---|---|---|---|
| CN | 103192325 | 7/2013 | |
| CN | 105415216 | 3/2016 | |
| DE | 103 61 895 | * 12/2003 | ............... B24D 7/10 |
| JP | S57-043649 | 9/1982 | |
| JP | 2000-233375 | 8/2000 | |
| JP | 2003-145433 | 5/2003 | |
| WO | WO 1996/005942 | 2/1996 | |
| WO | WO 1998/030358 | 7/1998 | |
| WO | WO 2000-041850 | 7/2000 | |
| WO | WO 2003/057410 | 7/2003 | |
| WO | WO 2006/091518 | 8/2006 | |
| WO | WO 2006/091519 | 8/2006 | |
| WO | WO 2010/085587 | 7/2010 | |
| WO | WO 2012-164078 | 12/2012 | |
| WO | WO 2013-070576 | 5/2013 | |
| WO | WO 2015-065793 | 5/2015 | |
| WO | WO 2016-209696 | 12/2016 | |
| WO | WO 2016-210057 | 12/2016 | |

OTHER PUBLICATIONS

EP Extended Search Report, EP 17884865.1, dated Sep. 9, 2020 (18 pages).

* cited by examiner

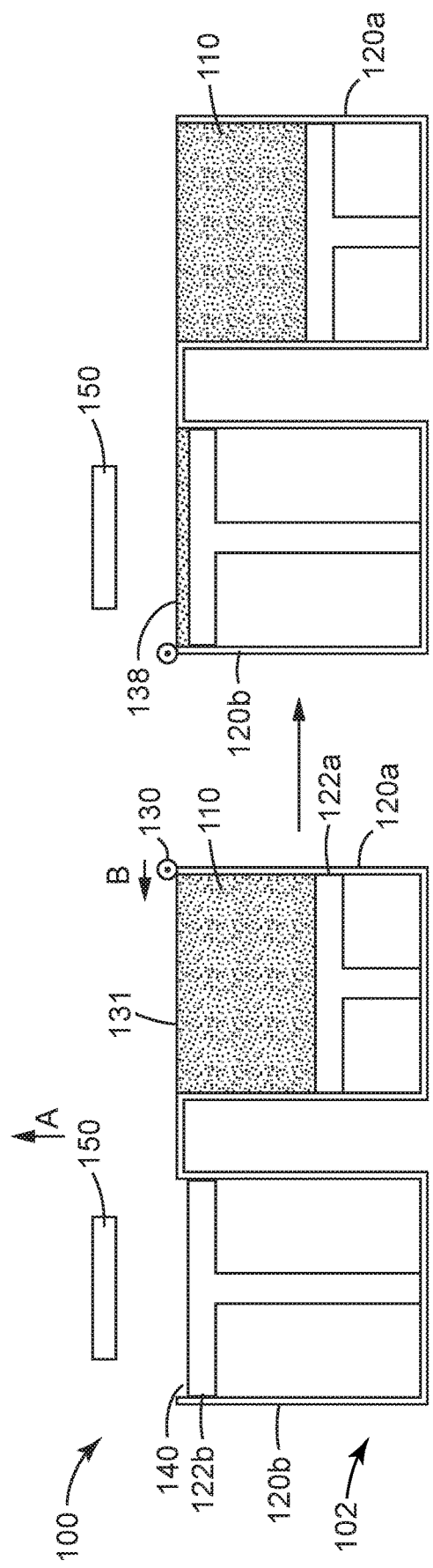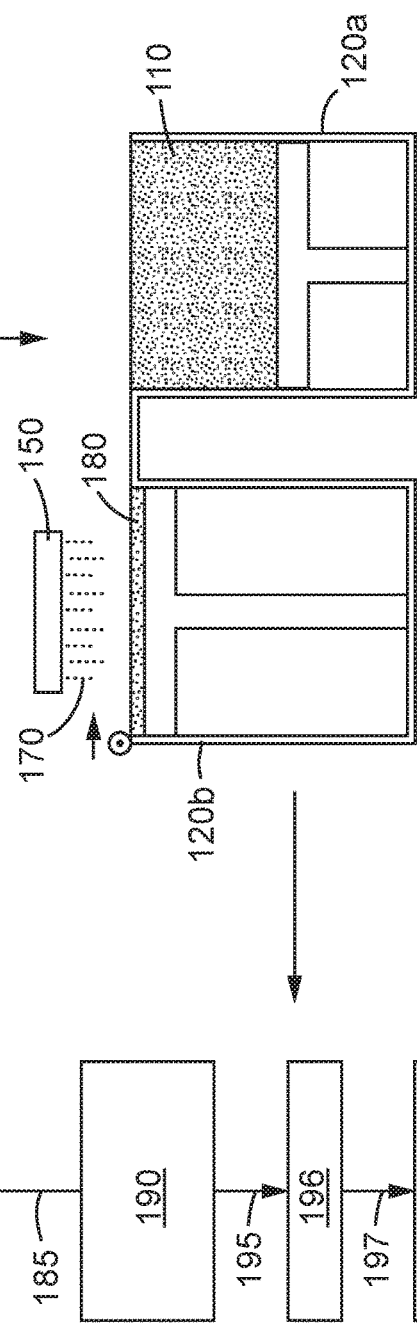

POLYMER BOND ABRASIVE ARTICLES AND METHODS OF MAKING THEM

CROSS REFERENCE TO RELATED APPLICATIONS

This application is a national stage filing under 35 U.S.C. 371 of PCT/US2017/066042, filed Dec. 13, 2017, which claims the benefit of U.S. Application No. 62/438,875, filed Dec. 23, 2016, the disclosure of which is incorporated by reference in its/their entirety herein.

BACKGROUND

Abrasive articles (e.g., abrasive wheels, abrasive segments, and whetstones) can be made by compressing a blend of abrasive particles (e.g., diamond, cubic boron nitride, alumina, or SiC), a vitreous bond precursor (e.g., glass frit, ceramic precursor) an optional pore inducer (e.g., glass bubbles, naphthalene, crushed coconut or walnut shells, or acrylic glass or PMMA), and a temporary organic binder in a liquid vehicle (e.g., aqueous solutions of phenolic resin, polyvinyl alcohol, urea-formaldehyde resin, or dextrin). The blended mix is then placed in a hardened steel mold, and then heated until the vitreous bond precursor is converted into a vitreous bond matrix.

There are many disadvantages to this manufacturing approach: each abrasive article shape requires a specialized mold; the molds typically are expensive and have a long lead time to make; any design change requires the manufacture of a new mold; there are limitations to the shapes that can be molded, complicated shapes with undercuts or internal structures such as cooling channels are generally not possible; molds wear out and have a limited number of units that can be manufactured per mold; while the molds are filled with the abrasive mixture, separation of the components can occur, leading to inhomogeneous abrasive components and density variation, which is easily visible. Moreover, the process is manual and labor intensive.

SUMMARY

In one aspect, the present disclosure is directed to polymer bonded abrasive articles, such as rotary polishing tools, wheels and components for finishing, abrasive segments, whetstones and the like, as well as methods for making them. The polymer bonded abrasive articles include shapes such as, for example, internal flow channels, or complex removal channels on the surface.

The polymer bonded abrasive articles can be made directly with a binder jetting three-dimensional (3D) printer, avoiding the need for producing a mold. In this method, a thin layer of powdered particles including polymer precursor particles and abrasive particles is temporarily bonded at desired locations by a jetted binder dispensed by an inkjet printing head. The printed powder layer is then at least partially dried and lowered so that a next powder layer can be spread. The powder spreading, temporary bonding and drying processes can be repeated to create a green abrasive article preform, which is then removed from the printer and extracted from the surrounding powder that remains unbound. The abrasive article preform is then further processed to convert the polymer precursor particles into a polymer matrix that retains the abrasive particles and forms a polymer bonded abrasive article.

In one embodiment, the present disclosure is directed to a polymer bond abrasive article including a polymer bond material having abrasive particles retained in a polymeric matrix therein, wherein the polymer bond abrasive article has at least one of a tortuous cooling channel and an arcuate cooling channel extending at least partially therethrough.

In another embodiment, the present disclosure is directed to a polymer bond abrasive article precursor including abrasive particles bonded in a polymeric matrix, wherein the polymer bond abrasive article precursor further includes at least one of at least one tortuous cooling channel extending at least partially through the polymer bond abrasive article precursor; or at least one arcuate cooling channel extending at least partially through the polymer bond abrasive article precursor.

In another embodiment, the present disclosure is directed to a method of making an abrasive article, including:

a) a subprocess, including:
  i) depositing a layer of loose powder particles in a confined region, wherein the loose powder particles include polymer bond precursor particles and abrasive particles, and wherein the layer of loose powder particles has substantially uniform thickness;
  ii) applying a liquid binder precursor material in predetermined regions of the layer of loose powder particles; and
  iii) converting the liquid binder precursor material into a temporary binder material, wherein the temporary binder material bonds to at least a portion of the polymer bond precursor particles and the abrasive particles in the predetermined regions to form a layer of bonded powder particles;

b) independently carrying out step a) a plurality of times to generate an abrasive article preform including the bonded powder particles and remaining loose powder particles, wherein in each step a), the loose powder particles are independently selected and the liquid binder precursor material is independently selected; and c) converting the polymer bond precursor particles in the abrasive article preform into polymer bond particles, wherein the polymer bond particles retain the abrasive particles to form a polymer bond abrasive article.

Features and advantages of the present disclosure will be further understood upon consideration of the detailed description as well as the appended claims.

BRIEF DESCRIPTION OF THE DRAWINGS

FIGS. 1A-1D illustrate a schematic process flow diagram of an embodiment of a method of making a polymer bond abrasive article.

Figure 2:
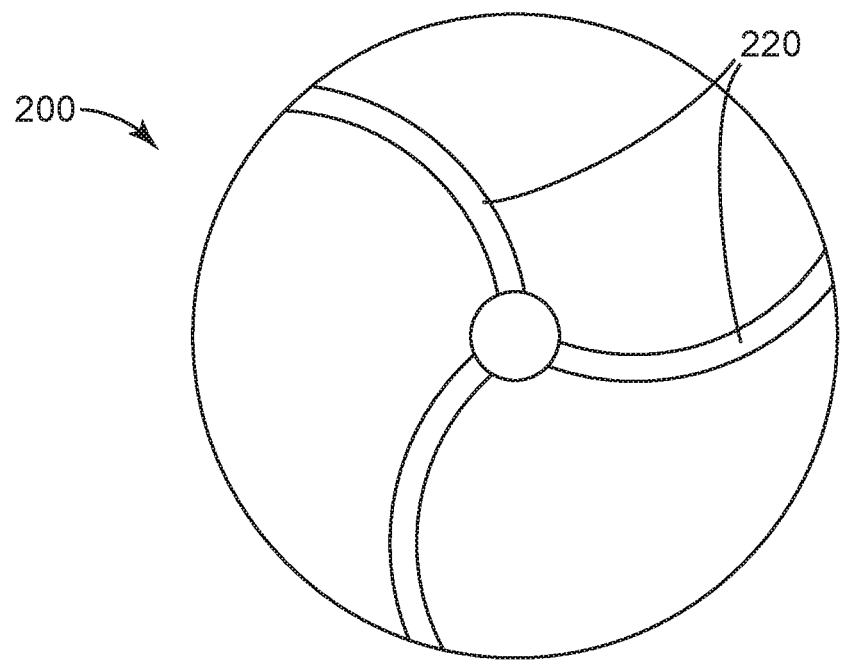
FIG. 2 is a schematic cross-sectional top view of an exemplary polymer bond abrasive wheel that can be prepared by the method of the present disclosure.

Repeated use of reference characters in the specification and drawings is intended to represent the same or analogous features or elements of the disclosure. Numerous other modifications and embodiments can be devised by those skilled in the art, which fall within the scope and spirit of the principles of the disclosure. The figures may not be drawn to scale.

DETAILED DESCRIPTION

FIGS. 1A-1D schematically depict an exemplary powder bed jetting process 100 that can be used to make a polymer bond abrasive article. FIG. 1A shows a schematic, non-limiting example of a three-dimensional (3D) printing apparatus 102 that can be used to additively build up a 3D model of a shaped abrasive article preform one layer at a time, by repeatedly depositing particulate materials over the same area. The 3D printer 102 creates the abrasive article preform by turning a 3D computer aided design (CAD) drawing into a plurality of two-dimensional, cross-sectional layers. The 3D printer 102 deposits successive layers of a mixture of particulates including abrasive particles and polymer precursor particles, which can then be bonded together in subsequent steps to form a green article referred to herein as the abrasive article preform.

Referring to FIG. 1A, the 3D printing apparatus 102 includes a first chamber 120a with a piston-driven feed platform ram 122a that can be moved in a direction A. The ram 122a supports a mixture of particulates 110, which in some embodiments includes abrasive particles. A powder spreading roller 130 moves in a direction B over the surface 131 of the particulate mixture 110 to substantially uniformly displace the particles in the particulate mixture 110 from the powder material feed platform ram 122a and the chamber 120a to the second chamber 120b.

The 3D printing apparatus 102 further includes a second chamber 120b with a piston-driven build platform ram 122b that moves along the direction A. Referring also to FIG. 1B, a confined particle mixture deposition region 140 above the ram 122b receives a deposited layer 138 of a mixture of loose powder particles including abrasive particles and polymer precursor particles, which may be the same or different from the particles in the mixture 110. In some embodiments, the loose powder layer 138 is of substantially uniform thickness. In some embodiments, which are provided as examples and are not intended to be limiting, the thickness of the layer may vary less than about 100 microns, or less than about 50 microns, or less than about 30 microns, or less than 10 microns.

The ram 122b may be adjusted so that the particle mixture deposition region 140 has any desired thickness. In various embodiments, the loose powder layer 138 may have any thickness up to about 1 millimeter, if a jetted liquid binder precursor material subsequently applied to the layers 138 (shown in FIG. 1C and discussed below) can contact all the particles in the selected regions where the liquid binder precursor material is applied. In some embodiments, the thickness of the loose powder layer 138 is from about 10 microns to about 500 microns, or about 10 microns to about 250 microns, or about 50 microns to about 250 microns, or about 100 microns to about 200 microns.

The abrasive particles in the loose powder layer 138 include may include any abrasive particle used in the abrasives industry. In various embodiments, the abrasive particles have a Mohs hardness of at least 4, or at least 5, or at least 6, more or at least 7, or at least 8, or at least 8.5, or at least 9. In certain embodiments, the abrasive particles include superabrasive particles, which as used herein refers to any abrasive particle having a hardness greater than or equal to that of silicon carbide (e.g., silicon carbide, boron carbide, cubic boron nitride, and diamond).

Specific examples of suitable abrasive materials include aluminum oxide (e.g., alpha alumina) materials (e.g., fused, heat-treated, ceramic, and/or sintered aluminum oxide materials), silicon carbide, titanium diboride, titanium nitride, boron carbide, tungsten carbide, titanium carbide, aluminum nitride, diamond, cubic boron nitride (cBN), garnet, fused alumina-zirconia, sol-gel derived abrasive particles, cerium oxide, zirconium oxide, titanium oxide, and combinations thereof. Examples of sol-gel derived abrasive particles can be found in U.S. Pat. No. 4,314,827 (Leitheiser et al.), U.S. Pat. No. 4,623,364 (Cottringer et al.); U.S. Pat. No. 4,744, 802 (Schwabel), U.S. Pat. No. 4,770,671 (Monroe et al.); and U.S. Pat. No. 4,881,951 (Monroe et al.). Agglomerate abrasive particles that comprise finer abrasive particles in a polymer bond matrix (e.g., as described in U.S. Pat. No. 6,551,366 (D'Souza et al.)) may also be used.

To achieve fine resolution, in some embodiments the particles in the loose powder layer 138 are sized (e.g., by screening) to have a maximum size of less than or equal to 400 microns, or less than or equal to 250 microns, or less than or equal to 200 microns, or less than or equal to 150 microns, or less than or equal to 100 microns, less than or equal to 80 microns, or even less than or equal to 10 microns, although larger sizes may also be used. The particles in the loose powder layer 138, including polymer bond precursor particles, abrasive particles, and any optional additional particulate components may have the same or different maximum particle sizes, $D_{90}$, $D_{50}$, and/or $D_{10}$ particle size distribution parameters.

In some embodiments, which are not intended to be limiting, the abrasive particles in the loose powder layer 138 can be at least one of diamond particles, cubic boron nitride particles, or metal oxide particles, and can have a density of about 3.5 g/cc to about 3.9 g/cc. In other embodiments, the abrasive particles in the loose powder layer 138 can be diamond agglomerates with a density of about 2.0 g/cc to about 2.2 g/cc.

The particles in the loose powder layer 138 further include polymer precursor particles. In some embodiments, the polymer precursor particles include thermoplastic polymeric resins that can be softened to flow at least partially around the abrasive particles. When at least partially hardened, the thermoplastic resins strengthen and adhesively retain the abrasive particles to make a polymer bonded abrasive article with a desired shape for a particular application. Non-limiting examples of suitable thermoplastic resins include polyethylene, polypropylene, polystyrene, acrylics, cyanoacrylates, epoxies, and combinations thereof. The thermoplastic materials may be softened by any suitable technique including application of thermal radiation or actinic radiation such as UV radiation.

In other embodiments, the polymer precursor particles in the loose powder layer 138 include organic thermosetting compounds such as, for example, phenolic resins (e.g., novolac and/or resole phenolic resins), acrylic monomers (e.g., poly(meth)acrylates, (meth)acrylic acid, (meth)acrylamides, and the like, wherein (meth) indicates acrylics or methacrylics), epoxy resins, cyanate resins, isocyanate resins (including polyurea and polyurethane resins), alkyd resins, urea-formaldehyde resins, aminoplast resins, silicones and combinations thereof. When at least partially hardened or cured, these thermosetting compounds develop a covalently crosslinked bond network that strengthens and adhesively retains the abrasive particles to make a polymer bonded abrasive article with a desired shape for a particular application. The thermosetting materials may be softened by any suitable technique including application of thermal radiation or actinic radiation such as UV radiation.

In various embodiments, the mixture of particulates in the loose powder layer 138 includes about 1 wt % to about 99 wt %, or about 5 wt % to about 95 wt %, or about 7 wt % to about 93 wt %, or about 10 wt % to about 90, or about 20 wt % to about 80 wt % polymer precursor particles. In various embodiments, the loose powder layer 138 includes about 1 wt % to about 99 wt %, or about 5 wt % to about 95 wt %, or about 15 wt % to about 85 wt %, or about 20 wt % to about 80 wt %, or about 30 wt % to about 70 wt %, or about 40 wt % to about 60 wt % abrasive particles.

More specific examples of suitable powder layers include, but are not limited to, about 7 wt % abrasive particles to about 93 wt % polymer precursor particles, or about 93 wt % abrasive particles to about 7 wt % polymer precursor particles, or about 76 wt % abrasive particles to about 24 wt % polymer precursor particles.

In some embodiments, the loose powder layer 138 may further include binder precursor particles. When reacted with or exposed to a liquid binder activating liquid in predetermined region(s) of the powder layer 138, the binder precursor particles can form in the predetermined regions a binder to temporarily bind the abrasive particles and the polymer precursor particles and the abrasive particles in the loose powder layer 138 and form an abrasive article preform as explained in more detail below. In some embodiments, some or all the loose powder particles 138 may coated with the binder precursor material, which is activated on the coated particles when exposed to the activating liquid.

In some embodiments, the particles in the loose powder layer 138 may optionally include other components such as, for example, pore inducers, lubricants, filler particles, processing aids, and mixtures and combinations thereof. Non-limiting examples of pore inducers include glass bubbles and organic particles. Suitable lubricants include, but are not limited to, graphite, sulfur, polytetrafluoroethylene (PTFE), molybdenum disulfide, and mixtures and combinations thereof. Suitable processing aids include, but are not limited to, flow agents such as fumed silica, nanosilica, stearates, starch, and mixtures and combinations thereof. The additives have little or no adverse effect on abrasive particles employed in the polymer bond abrasive articles.

The particles in the loose powder layer 138 may optionally be modified to improve their flowability and the uniformity of the layer spread. Methods of improving the powders include agglomeration, spray drying, gas or water atomization, flame forming, granulation, milling, and sieving.

In some embodiments, the abrasive particles in the loose powder layer 138 may optionally include one or more coating layers to promote adhesion to the polymer precursor particles, control the total amount of resin in the polymer bond abrasive article, and the like. In one example, which is not intended to be limiting, the abrasive particles may include a coating of a phenolic resin prepolmer such as a Resol resin, and may also by coated with a novolac phenolic resin material prior to spreading.

In some embodiments, the particles in the loose powder layer 138 may optionally include a ceramic precursor (e.g., a precursor of alumina or zirconia) such as, for example, bauxite, boehmite, calcined alumina, or calcined zirconia that when fired converts to the corresponding ceramic form.

Referring to FIG. 1C, a liquid binder precursor material 170 is jetted by the print head 150 of the 3D printing apparatus 102 onto predetermined region(s) 180 of the loose powder layer 138. The liquid binder precursor material thus coats the loose powder particles in the region 180, and is subsequently converted to a binder that at least temporarily bonds the loose powder particles in the predetermined region 180 to each other. The liquid binder precursor material 170 may be any composition that can be converted (e.g., by evaporation, or thermal, chemical, and/or radiation curing (e.g., using UV or visible light)) into a binder material that bonds the loose powder particles together according to a jetted pattern obtained by programmed movement of the print head 150 (and ultimate 3-D shape upon multiple repetitions).

In some embodiments, the liquid binder precursor material 170 includes a liquid carrier and a polymer. The liquid carrier may include one or more of at least one organic solvent and water. Exemplary organic solvents include, but are not limited to, alcohols (e.g., butanol, ethylene glycol monomethyl ether), ketones, and ethers, which in some non-limiting embodiments have a flash point above 100° C. Selection of a suitable solvent or solvents will typically depend upon requirements of the specific application, such as, for example, desired surface tension and viscosity, the selected particulate solid, and the like.

In some embodiments, the one or more organic solvents included in the liquid carrier can, for instance, control at least one of the drying speed or the surface tension of the liquid binder precursor material 170, allow dissolution of an ingredient (e.g., of a surfactant), or, as a minor component of any of the ingredients; e.g., an organic co-solvent may be present in a surfactant added as an ingredient to the liquid carrier. Exemplary organic solvents for the liquid binder precursor material 170 include, but are not limited to, alcohols such as methyl alcohol, ethyl alcohol, n-propyl alcohol, isopropyl alcohol, n-butyl alcohol, sec-butyl alcohol, t-butyl alcohol, and isobutyl alcohol; ketones or ketoalcohols such as acetone, methyl ethyl ketone, and diacetone alcohol; esters such as ethyl acetate and ethyl lactate; polyhydric alcohols such as ethylene glycol, diethylene glycol, triethylene glycol, propylene glycol, butylene glycol, 1,4-butanediol, 1,2,4-butanetriol, 1,5-pentanediol, 1,2,6-hexanetriol, hexylene glycol, glycerol, glycerol ethoxylate, trimethylolpropane ethoxylate; lower alkyl ethers such as ethylene glycol methyl or ethyl ether, diethylene glycol ethyl ether, triethylene glycol methyl or ethyl ether, ethylene glycol n-butyl ether, diethylene glycol n-butyl ether, diethylene glycol methyl ether, ethylene glycol phenyl ether, propylene glycol methyl ether, dipropylene glycol methyl ether, tripropylene glycol methyl ether, propylene glycol methyl ether acetate, dipropylene glycol methyl ether acetate, propylene glycol n-propyl ether, dipropylene glycol n-propyl ether, tripropylene glycol n-propyl ether, propylene glycol n-butyl ether, dipropylene glycol n-butyl ether, tripropylene glycol n-butyl ether, propylene glycol phenyl ether, and dipropylene glycol dimethyl ether; nitrogen-containing compounds such as 2-pyrrolidinone and N-methyl-2-pyrrolidinone; sulfur-containing compounds such as dimethyl sulfoxide, tetramethylene sulfone, and thioglycol; and combinations of any of the foregoing.

The liquid carrier can be entirely water, or can contain water in combination with one or more organic solvents suitable to dissolve the polymer in the liquid binder precursor material 170. Preferably, the aqueous carrier contains, on a total weight basis, at least 20 percent water, at least 30 percent water, at least 40 percent water, at least 50 percent water, or even at least 75 percent water.

The amounts of organic solvent and/or water within the liquid carrier can depend on several factors, such as the particularly desired properties of the liquid binder precursor material 170 such as the viscosity, surface tension, and/or drying rate, which can in turn depend on factors such as the type of ink jet printing technology intended to be used with the liquid binder precursor material, such as piezo-type or thermal-type print heads 150, for example.

The polymer in the liquid binder precursor material 170 can be soluble or dispersible in the liquid carrier. Examples of suitable polymers for the liquid binder precursor material 170 include polyvinyl pyrrolidones, polyvinyl caprolactams, polyvinyl alcohols, polyacrylamides, poly(2-ethyl-2-oxazoline) (PEOX), polyvinyl butyrate, copolymers of methyl vinyl ether and maleic anhydride, certain copolymers of acrylic acid and/or hydroxyethyl acrylate, methyl cellulose, natural polymers (e.g., dextrin, guar gum, xanthan gum). In some embodiments, polyvinyl pyrrolidones can be used with liquid carriers that include water or are predominantly water. Other organic polymers than those listed above may be used instead or in addition if desired.

The liquid binder precursor material 170 may include one or more free-radically polymerizable or otherwise radiation-curable materials; for example, acrylic monomers and/or oligomers and/or epoxy resins. An effective amount of photoinitiator and/or photocatalysts for curing the free-radically polymerizable or otherwise radiation-curable materials may also be included. Examples of suitable (meth) acrylate monomers and oligomers and otherwise radiation-curable materials (e.g., epoxy resins) can be found in, for example, U.S. Pat. No. 5,766,277 (DeVoe et al.).

In some preferred embodiments, the liquid binder precursor material 170 is essentially free of (e.g., contains less than 1 percent, less than 0.1 percent, less than 0.01 percent, or is even free of) metal nanoparticles and/or metal oxide nanoparticles. As used herein, the term "nanoparticles" refers to particles having an average particle diameter of less than or equal to one micron, or less than or equal to 500 nanometers (nm), or even less than or equal to 150 nm.

Alternatively, or in addition, the liquid binder precursor 170 may be an aqueous sol including a ceramic precursor for alumina and/or zirconia. Examples include aqueous boehmite sols and zirconia sols. In such cases, after firing to produce a polymer bond abrasive article, the liquid binder precursor 170 may have the same or different composition as the abrasive particles. Details concerning zirconia sols can be found, for example, in U.S. Pat. No. 6,376,590 (Kolb et al.). Details concerning boehmite sols can be found, for example, in U.S. Pat. No. 4,314,827 (Leitheiser et al.), U.S. Pat. No. 5,178,849 (Bauer) U.S. Pat. No. 4,518,397 (Leitheiser et al.), U.S. Pat. No. 4,623,364 (Cottringer et al.), U.S. Pat. No. 4,744,802 (Schwabel), U.S. Pat. No. 4,770,671 (Monroe et al.), U.S. Pat. No. 4,881,951 (Wood et al.), U.S. Pat. No. 4,960,441 (Pellow et al.) U.S. Pat. No. 5,011,508 (Wald et al.), U.S. Pat. No. 5,090,968 (Pellow), U.S. Pat. No. 5,139,978 (Wood), U.S. Pat. No. 5,201,916 (Berg et al.), U.S. Pat. No. 5,227,104 (Bauer), U.S. Pat. No. 5,366,523 (Rowenhorst et al.), U.S. Pat. No. 5,429,647 (Larmie), U.S. Pat. No. 5,547,479 (Conwell et al.), U.S. Pat. No. 5,498,269 (Larmie), U.S. Pat. No. 5,551,963 (Larmie), U.S. Pat. No. 5,725,162 (Garg et al.), and U.S. Pat. No. 5,776,214 (Wood)).

In some embodiments, the jetted liquid binder precursor 170 may be an activating liquid that reacts with or contacts the solid binder precursor particles in predetermined region(s) of the loose powder layer 138, and causes the binder precursor particles to form a binder to temporarily bond together the abrasive particles and the polymer precursor particles in the predetermined areas the binder. In some embodiments, the jetted activating liquid 170 reacts with or contacts a binder precursor layer on selected particles in the loose powder layer 138, which then causes the binder precursor layer to form a binder to bond together the abrasive particles and the polymer precursor particles in the predetermined regions.

Referring now to FIG. 1D, the jetted liquid binder precursor material 170 is converted (step 190) into a binder material that at least temporarily bonds together the loose powder particles in predetermined regions 180 of the loose powder particles 138 to form a layer of bonded powder particles. The liquid binder precursor material may be converted to the liquid binder in a wide variety of ways such as, for example, by evaporation of the liquid carrier in the liquid binder precursor material 170, or by melting or softening of the liquid binder precursor material. Cooling may be accomplished by any means known to the art (e.g., cold quenching or air cooling to room temperature).

The above steps are then repeated (step 185 of FIG. 1D) with changes the region 180 where jetting is carried out in selected areas of the loose powder layer 138 according to a predetermined programmed design to produce in step 195 of FIG. 1D, through repetition, layer on layer, a three-dimensional (3D) green abrasive article preform 196. In each repetition, the loose powder particles and the liquid binder precursor material may be independently selected; that is, either or both or the loose powder particles and the liquid binder precursor material may be the same as, or different from those in adjacent deposited layers.

The resulting abrasive article preform 196 is a green abrasive article that includes the powder particles bonded by the binder material as well as any remaining unbound loose powder particles. Once sufficient repetitions have been carried out to form the abrasive article preform 196, in some embodiments the abrasive article preform can be separated from substantially all (e.g., at least 85 percent, at least 90 percent, at least 95 percent, or at least 99 percent) of the remaining unbound loose powder particles, although this is not a requirement in the process of the present disclosure.

If desired, multiple particle reservoirs each containing a different powder may be used in each step 185 of the process of FIG. 1. Likewise, multiple different liquid binder precursor materials 170 may be used, either through a common printhead 150 or, in some embodiments, through separate printheads. Different powders/binders can thus be distributed in different and discrete regions of the polymer bond abrasive article. For example, relatively inexpensive, but lower performing abrasive particles and or polymer bond precursor particles may be relegated to regions of the polymer bond abrasive article where it is not particularly important to have high performance properties (e.g., in the interior away from an abrading surface).

Powder bed jetting 3D printing equipment suitable for making the polymer bonded abrasive articles of the present disclosure are commercially available from, for example, from ExOne, North Huntington, Pa. Further details concerning powder bed jetting techniques suitable for practicing the present disclosure can be found, for example, in U.S. Pat. No. 5,340,656 (Sachs et al.) and U.S. Pat. No. 6,403,002 B1 (van der Geest).

In step 197 of FIG. 1D, the green abrasive article preform 196 is further processed to form a polymer bond abrasive article 198. The further processing step 197 may vary widely depending on the intended application, but generally transforms the polymer precursor particles in the abrasive particle preform 196 into a polymeric matrix that retains or bonds with the abrasive particles in the preform 196.

In some embodiments, the processing step 197 includes heating the abrasive article preform 196 to cause the polymer precursor particles to soften and flow around at least some of the abrasive particles in the abrasive article preform 196. The softened polymer precursor particles occupy the interstices between the abrasive particles to form an abrasive article retaining matrix. The temperature to which the abrasive article preform 196 is heated of course depends on the polymeric precursor and the abrasive particles present therein, but in some non-limiting example embodiments the preform 196 is heated to about 150° C. to about 350° C., or about 200° C. to about 250° C., or about 205° C. to about 230° C. The preform 196 may be heated by any suitable method including, for example in an oven, with a laser, or by application of radiation. In some embodiments, the temperature to which the preform 196 is heated may be sufficient to remove at least a portion of, or all, of the binder material present in the preform 196. Following a cooling step, the polymeric matrix sufficiently retains the abrasive particles such that the resulting polymer bond abrasive article 198 can be used in a selected grinding application.

In another embodiment, the processing step 197 may include application to the abrasive article preform 196 of actinic radiation such as, for example ultraviolet (UV) radiation, to at least partially cure the polymeric precursor particles and form the polymeric matrix to retain at least some of the abrasive particles and form the polymer bond abrasive article 198.

In yet another embodiment, the processing step 197 may include application of an activating or polymerizing material to the abrasive article preform 196 to at least partially polymerize the polymer precursor particles and form the polymeric matrix to retain at least some of the abrasive particles and form the polymer bond abrasive article 198.

It should be noted that the processing step 197 can include one or a combination of application of heat, actinic radiation, or polymerizing and activating materials, and these processing steps may be performed continuously or in a batch form.

In some embodiments, polymer bond abrasive articles 198 can have considerable porosity throughout their volumes. Accordingly, in some embodiments the abrasive article preform 196 may optionally be infused with a solution or dispersion of additional polymer bond precursor material, or grain growth modifiers prior to, during, or after the processing step 197.

Methods according to the present disclosure are suitable for manufacturing various polymer bond abrasive articles 198 that cannot be readily or easily fabricated by other methods. For example, internal voids may be included in the polymer bond abrasive articles 198, if an opening to the exterior of the abrasive article preform 196 exists for removal of unbonded loose powder. Cooling channels, which have tortuous and or arcuate paths open to the exterior of the polymer bond abrasive article 198, can be readily manufactured using methods of the present disclosure. In some embodiments, the polymer bond abrasive articles 198 can have a single opening, but more typically they have two or more openings. A cooling medium (e.g., air, water or oil) circulates through the cooling channel(s) to remove heat generated during abrading. In some embodiments, the polymer bond abrasive article 198 can be further infused with an infiltrant to densify and strengthen the part. In one example, which is not intended to be limiting, the polymer bond abrasive particle 198 can be immersed in a polymeric infiltrant, and the polymeric material can be allowed to enter any unwanted voids within the part. The polymeric infiltrant can then be cured to hardened to strengthen the infiltrated part or otherwise modify its properties for a particular application.

The polymer bond abrasive article 198 may optionally be machined or attached to a metal mandrel to form a suitable grinding part such as, for example, unitary structured abrasive discs, grinding bits, abrasive segments, shaped abrasive particles (e.g., triangular abrasive particles), abrasive wheels and the like.

Referring now to FIG. 2, an exemplary polymer bond abrasive wheel 200 has arcuate cooling channels 220.

Figure 3:
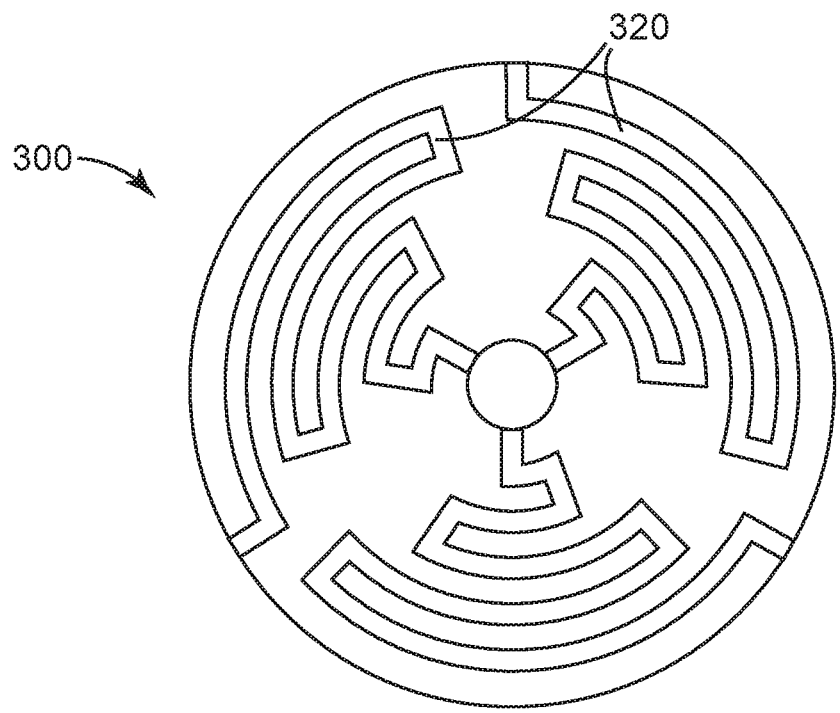
FIG. 3 is a schematic cross-sectional top view of an exemplary polymer bond abrasive wheel that can be prepared by the method of the present disclosure.

FIG. 3 shows another exemplary polymer bond abrasive wheel 300 that has tortuous cooling channels 320.

Figure 4:
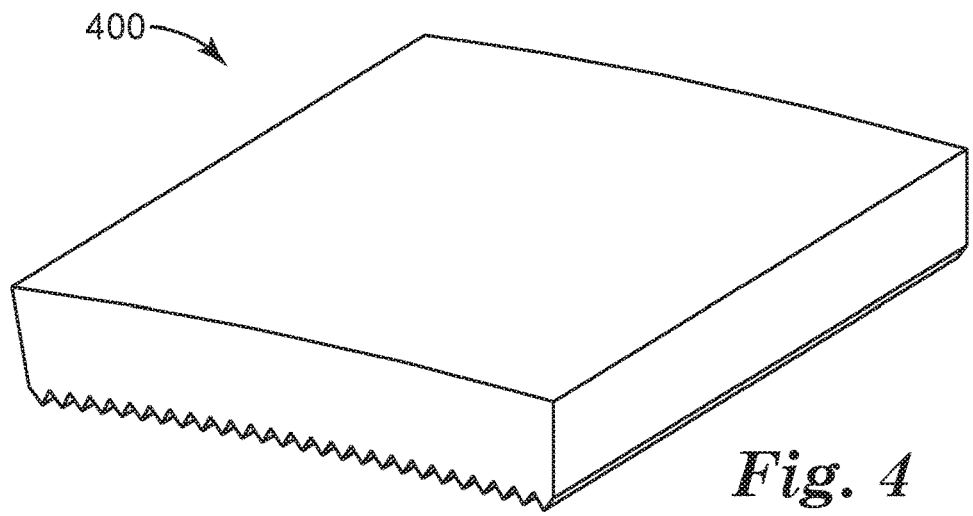
FIG. 4 is a schematic perspective view of an exemplary polymer bond abrasive segment that can be prepared by the method of the present disclosure.

FIG. 4 shows an exemplary polymer bond abrasive segment 400. In typical use, multiple polymer bond abrasive segments 400 are mounted evenly spaced along the circumference of a metal disc to form an abrasive wheel.

Figure 5:
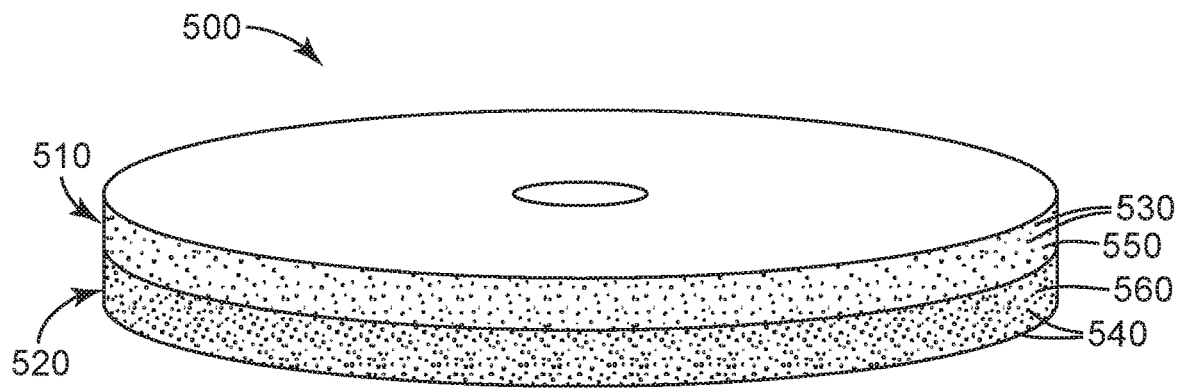
FIG. 5 is a schematic perspective view of a polymer bond abrasive wheel that can be prepared by the method of the present disclosure.
Figure 6A:
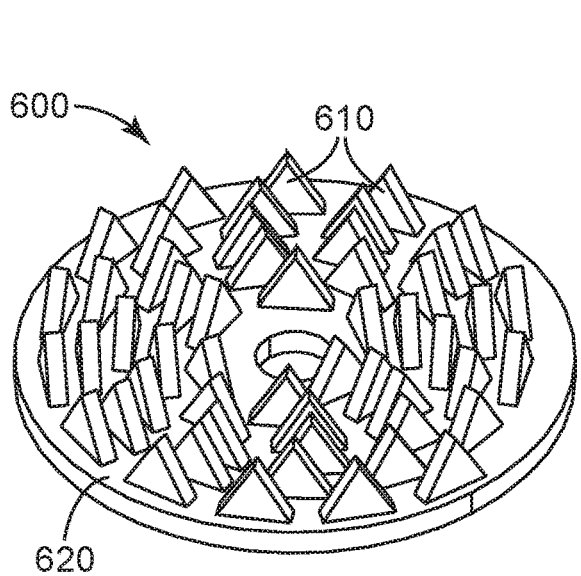
FIG. 6A is a schematic perspective view of a unitary structured abrasive disc that can be prepared by the method of the present disclosure.
Figure 6B:
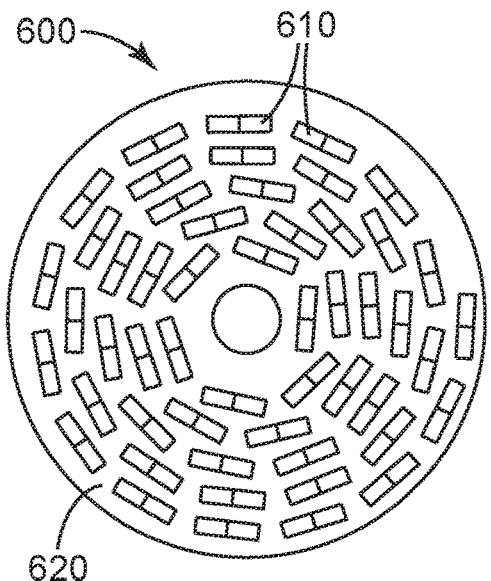
FIG. 6B is a schematic top view of the unitary structured abrasive disc of FIG. 6A.
Figure 7A:
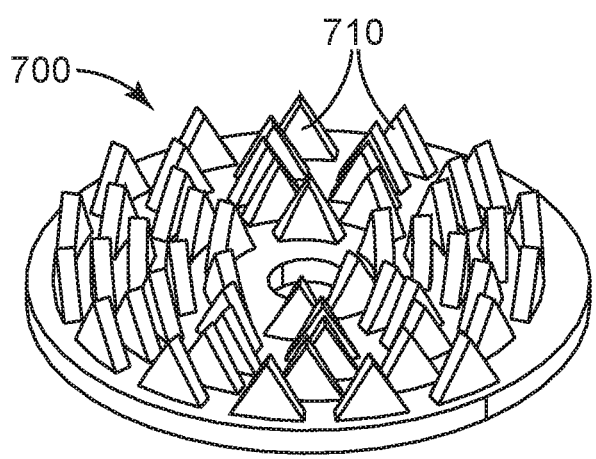
FIG. 7A is a schematic perspective view of a unitary structured abrasive disc 700 that can be made by the method of the present disclosure.
Figure 7B:
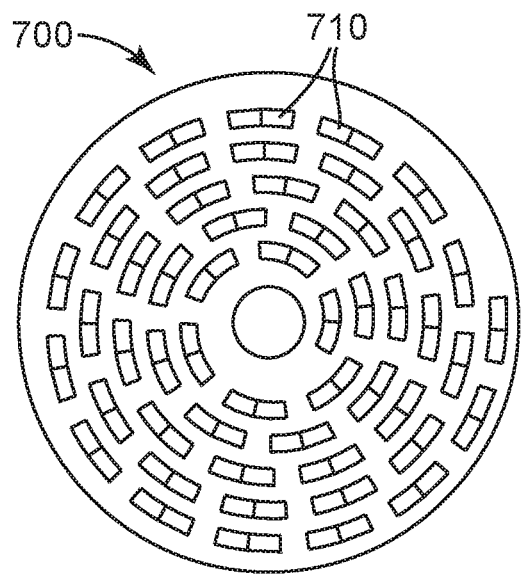
FIG. 7B is a schematic top view of unitary structured abrasive disc of FIG. 7A.

FIG. 5 shows a polymer bond abrasive disc 500 has two regions 510, 520. Each region has abrasive particles 530, 540 retained in a polymer bond matrix material 550, 560, respectively.

FIGS. 6A-6B and 7A-7B, respectively show various unitary structured abrasive discs with precisely-shaped abrasive elements 610, 710 formed integrally with planar bases 620, 720.

Figure 8:
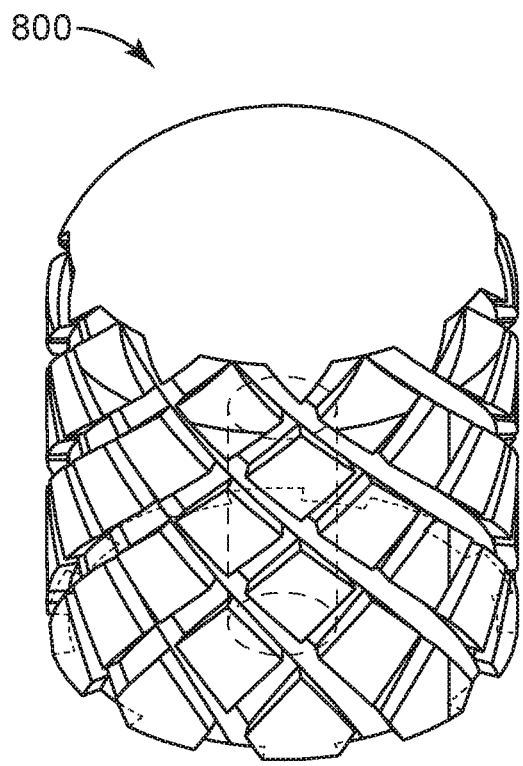
FIG. 8 is a schematic perspective view of rotary abrasive tool 800 that can be prepared by the method of the present disclosure.

FIG. 8 shows a rotary abrasive tool 800 (a bit for a handheld motor driven shaft such as, for example, a Dremel tool).

The foregoing polymer abrasive wheels shown in FIGS. 2 and 3 can be prepared by heating or otherwise converting the corresponding green abrasive article precursor bodies (i.e., having the same general shape features, but including a polymer bond precursor particles held together by a temporary binder).

SELECT EMBODIMENTS OF THE PRESENT DISCLOSURE

Embodiment A

A polymer bond abrasive article including a polymer bond material having abrasive particles retained in a polymeric matrix therein, wherein the polymer bond abrasive article has at least one of a tortuous cooling channel and an arcuate cooling channel extending at least partially therethrough.

Embodiment B

The polymer bond abrasive article of Embodiment A, wherein the abrasive particles include first abrasive particles and second abrasive particles, wherein the first abrasive particles and second abrasive particles are disposed in predetermined different regions within the polymer bond abrasive article.

Embodiment C

The polymer bond abrasive article of Embodiments A or B, wherein the different regions are layers.

Embodiment D

The polymer bond abrasive article of any one of Embodiments A to C, wherein the abrasive particles include at least one of diamond particles or cubic boron nitride particles.

Embodiment E

The polymer bond abrasive article of any one of Embodiments A to D, wherein the abrasive particles include at least one of silicon carbide, boron carbide, silicon nitride, or metal oxide ceramic particles.

Embodiment F

The polymer bond abrasive article of any one of Embodiments A to E, wherein the polymer bond abrasive article is chosen from a unitary structured abrasive disc, an abrasive grinding bit, an abrasive segment, and an abrasive wheel.

Embodiment G

A polymer bond abrasive article precursor including abrasive particles bonded in a polymeric matrix, wherein the polymer bond abrasive article precursor further includes at least one of at least one tortuous cooling channel extending at least partially through the polymer bond abrasive article precursor; or at least one arcuate cooling channel extending at least partially through the polymer bond abrasive article precursor.

Embodiment H

The polymer bond abrasive article precursor of Embodiment G, wherein the abrasive particles include at least one of silicon carbide, boron carbide, silicon nitride, or metal oxide ceramic particles.

Embodiment I

A method of making an abrasive article, including:
a) a subprocess, including:
i) depositing a layer of loose powder particles in a confined region, wherein the loose powder particles include polymer bond precursor particles and abrasive particles, and wherein the layer of loose powder particles has substantially uniform thickness;
ii) applying a liquid binder precursor material in predetermined regions of the layer of loose powder particles;
iii) converting the liquid binder precursor material into a temporary binder material, wherein the temporary binder material bonds to at least a portion of the polymer bond precursor particles and the abrasive particles in the predetermined regions to form a layer of bonded powder particles;
(b) independently carrying out step a) a plurality of times to generate an abrasive article preform including the bonded powder particles and remaining loose powder particles, wherein in each step a), the loose powder particles are independently selected and the liquid binder precursor material is independently selected; and
(c) converting the polymer bond precursor particles in the abrasive article preform into polymer bond particles, wherein the polymer bond particles retain the abrasive particles to form a polymer bond abrasive article.

Embodiment J

The method of Embodiment I, wherein the abrasive particles include at least one of diamond particles, cubic boron nitride particles, or metal oxide ceramic particles.

Embodiment K

The method of any one of Embodiments I and J, wherein the liquid binder precursor material includes a liquid carrier having a polymer dissolved or dispersed therein.

Embodiment L

The method of any one of Embodiments I to K, further including separating substantially all the remaining loose powder particles from the abrasive article preform prior to the converting step (c).

Embodiment M

The method of any of Embodiments I to L, wherein the loose powder particles include submicron ceramic particles.

Embodiment N

The method of any one of Embodiments I to M, wherein the polymer bond precursor particles are chosen from urethane resins, epoxy resins, phenolic resins, and combinations thereof.

Embodiment O

The method of any one of Embodiments I to N, wherein the converting step (c) includes heating the abrasive article preform to a temperature sufficient to at least partially soften the polymer bond precursor particles to form the polymer bond particles.

Embodiment P

The method of any one of Embodiments I to O, wherein the converting step (c) includes heating the abrasive article preform to a temperature sufficient to polymerize the polymer bond precursor particles to form the polymer bond particles.

Embodiment Q

The method of any one of Embodiments I to P, wherein the converting step (c) includes heating a selected portion of the abrasive article preform to a temperature sufficient to at least partially soften the polymerize the polymer bond precursor particles to form the polymer bond particles.

Embodiment R

The method of any one of Embodiments I to Q, wherein the abrasive article preform is heated to a temperature of about 150° C. to about 250° C.

Embodiment S

The method of any one of Embodiments I to R, wherein the converting step (c) includes applying a polymerizing agent to the abrasive article preform to at least partially polymerize the polymer bond precursor particles to from polymer bond particles.

Embodiment T

The method of any one of Embodiments I to S, further including heating the loose powder particles prior to step (a)(ii).

Embodiment U

The method of any of Embodiments I to T, wherein the loose powder particles are heated to a temperature of up to about 30° C.

Embodiment V

The method of any one of Embodiments I to U, wherein the temporary binder material includes a polyvinyl pyrrolidone.

Embodiment W

A method of making an abrasive article, including:
a) a subprocess, including:
i) depositing a layer of loose powder particles in a confined region, wherein the loose powder particles include about 5 wt % to 95 wt % polymer bond precursor particles and about 5 wt % to about 95 wt % abrasive particles, and wherein the layer of loose powder particles has substantially uniform thickness;
ii) jetting a liquid binder precursor material in predetermined regions of the layer of loose powder particles; and
iii) converting the liquid binder precursor material into a temporary binder material that bonds together particles of the loose powder particles in the predetermined regions to form a layer of bonded powder particles;
(b) independently carrying out step a) a plurality of times to generate an abrasive article preform including the bonded powder particles and remaining loose powder particles, wherein in each step a), the loose powder particles are independently selected and the liquid binder precursor material is independently selected; and
(c) heating the polymer bond precursor particles in the abrasive article preform to cure the polymer bond precursor particles to form polymer bond particles, wherein the polymer bond particles retain the abrasive particles to form a polymer bond abrasive article.

Embodiment X

The method of Embodiment W, further including heating the loose powder particles to a temperature of up to about 30° C. prior to step (a) (ii).

Embodiment Y

The method of Embodiment W or X, further including separating substantially all the remaining loose powder particles from the abrasive article preform prior to the converting step (c).

Embodiment Z

The method of any of Embodiments W to Y, wherein the loose powder particles further include polymer bond precursor particles.

Embodiment AA

The method of any of Embodiments W to Z, further including sintering the polymer bonded abrasive article following step (c) to convert the polymer bond precursor particles into polymer bond particles and form a polymer bonded abrasive article.

Embodiment BB

The method of any of Embodiments W to AA, further including infiltrating the polymer bonded abrasive article with a polymeric infiltrant.

Objects and advantages of this disclosure are further illustrated by the following non-limiting examples, but the particular materials and amounts thereof recited in these examples, as well as other conditions and details, should not be construed to unduly limit this disclosure.

EXAMPLES

General Process Description:

A mixture of polymer powder and abrasive particles was prepared and placed into the feed chamber of the ExOne M-LAB 3D printer, obtained from The ExOne Company, North Huntingdon, Pa. The binder supply bottle of the printer was filled with an ether solvent-based polymer binder, obtained as PM-B-SR1-04 from ExOne. 3D models were prepared into file to make example parts for rotary tools and polishing shapes, and the files were prepared into print jobs for the ExOne M-lab printer.

After printing, the printed segments and parts were extracted, depowdered and found to be quite stable. Those segments and parts were placed on metal mandrels, and placed into an oven to densify the powder around the agglomerates and attach the 3D shape to the metal mandrel. Densified parts were evaluated for abrasive performance as described below.

Example 1

Powder mixture was prepared by weight of: 67% Polyurethane powder from Lubrizol X2006-NAT-025PWD (Lubrizol Advanced Materials, Brecksville, Ohio) and 33% 9 µm Diamond Agglomerates (3M Company, Cumberland, Wis. 012116-SD1). The 3D model used to create the part was a hollow cylinder with a cap. The shaped part was printed in the ExOne M-lab 3D printer. The layer height was 100 μm, spreader speed was 5 mm/min, printing saturation was set to the nominal 90% level, and drying time was set at 15 seconds with heater power set at 50%. The binder was ExOne PM-B-SR1-04.

Figure 9:
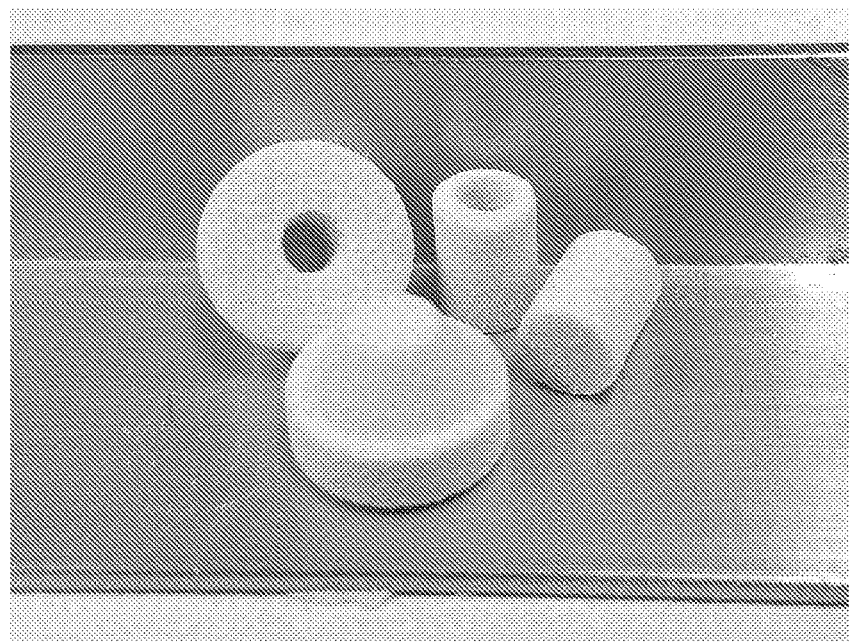
FIG. 9 is a photograph of the 3D printed parts after depowdering for Examples 1 and 2.
Figure 10:
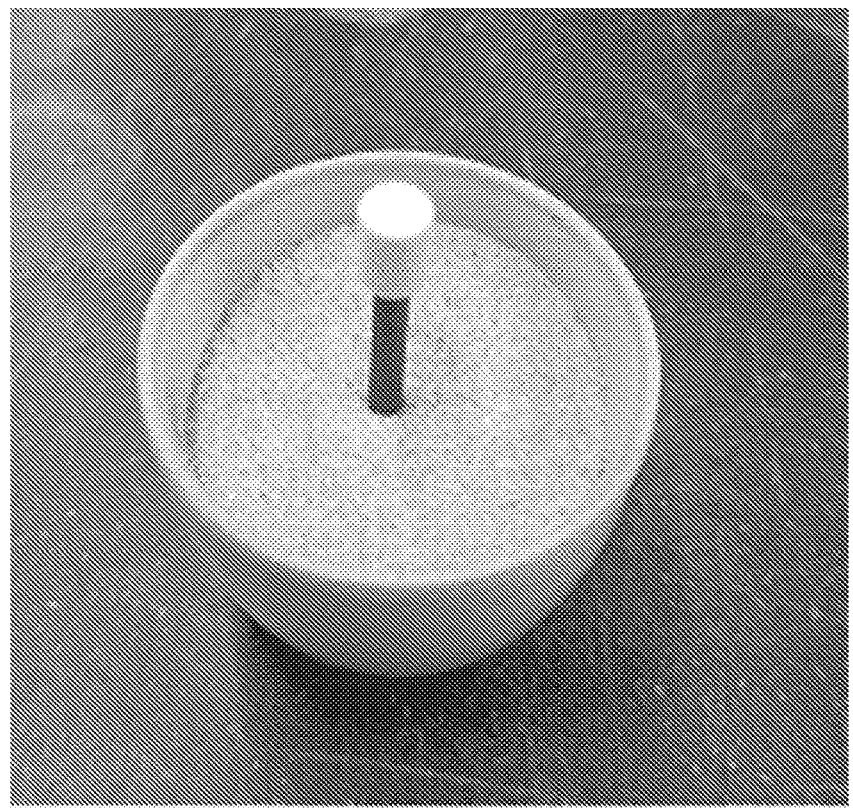
FIG. 10 is a photograph of the 3D printed part placed on the steel mandrel for Example 1, prior to curing in the oven.
Figure 11:
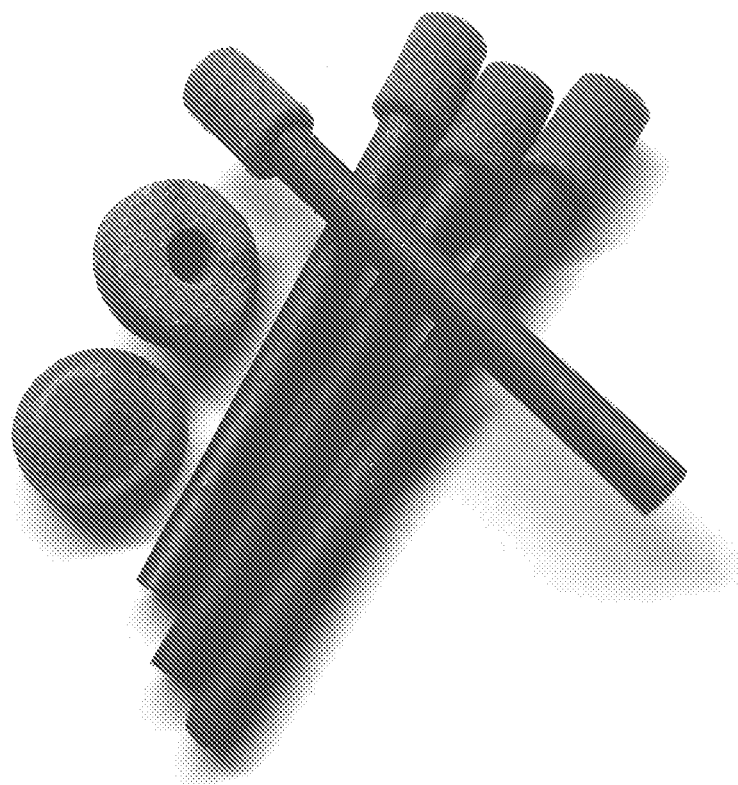
FIG. 11 is a photograph of the 3D printed parts of Examples 1 and 2 after curing in the oven.

The parts were depowdered (FIG. 9) and placed onto 3 mm diameter steel mandrels as shown in the photographs of FIG. 10. Then the parts were cured at 210° C. for 1 hour. Photographs of the resulting cured articles are shown in FIG. 11.

Example 2

Powder mixture was prepared the same as for Example 1: 67% Polyurethane powder from Lubrizol X2006-NAT-025PWD and 33% 9 μm Diamond Agglomerates (3M Cumberland, 012116-SD1). The 3D model used to create the part was a truncated cone on a hollow cylinder. The shaped part was printed in the ExOne M-lab 3D printer. The layer height was 100 μm, spreader speed was 5 mm/min, printing saturation was set to the nominal 90% level, and drying time was set at 15 seconds with heater power set at 50%. The binder was ExOne PM-B-SR1-04.

The parts were depowdered (FIG. 9) and placed on a small amount of the diamond agglomerates (only) in an aluminum tray. Then the parts were cured at 210° C. for 1 hour. Photographs of the resulting cured articles are shown in FIG. 11.

Example 3

Powder mixture was prepared the same as for Example 1: 67% Polyurethane powder from Lubrizol X2006-NAT-025PWD and 33% 9 μm Diamond Agglomerates (3M Cumberland, 012116-SD1). The 3D model used to create the part was a cylinder with arcuate grooves around the exterior and rounded top with reverse tapered conical holes aligned to the radius which connected to a blind central hole along the axis of the cylinder. The shaped part was printed in the ExOne M-lab 3D printer. The layer height was 100 μm, spreader speed was 5 mm/min, printing saturation was set to the nominal 90% level, and drying time was set at 15 seconds with heater power set at 50%. The binder was ExOne PM-B-SR1-04.

Figure 12:
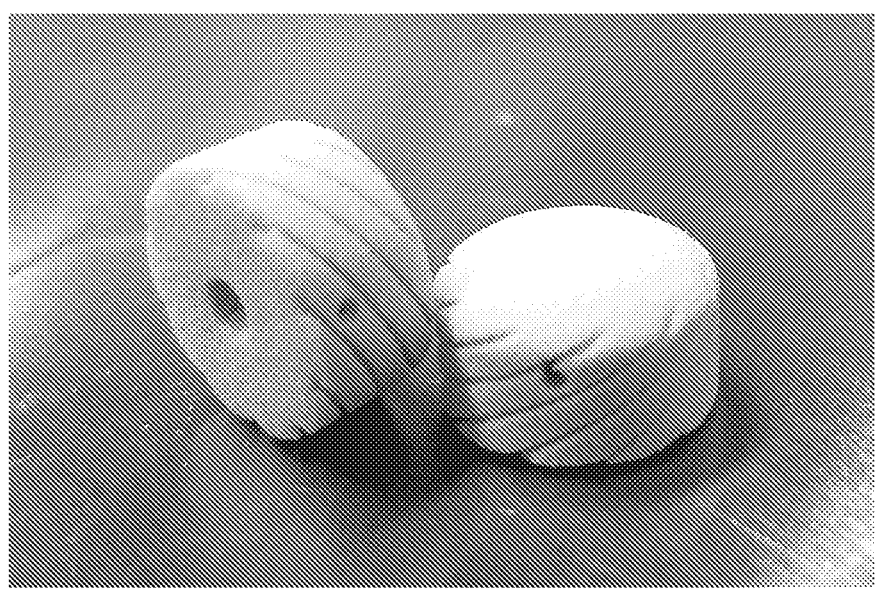
FIG. 12 is a photograph of the 3D printed parts of Example 3 after depowdering.

The parts were depowdered, and photographs of the depowdered parts are shown in FIG. 12.

Example 4

Powder mixture was prepared by weight of: 30% 3M Scotchkote 6258 epoxy (3M Company, St. Paul, Minn.) and 70% P280 Alumina abrasive (Imerys Fused Minerals GmbH, Villach, Austria). The 3D model used to create the part was a hollow cylinder with a cap. The shaped part was printed in the ExOne M-lab 3D printer. The layer height was 100 μm, spreader speed was 5 mm/min, printing saturation was set to the nominal 90% level, and drying time was set at 15 seconds with heater power set at 80%. The binder was ExOne PM-B-SR1-04.

Figure 13:
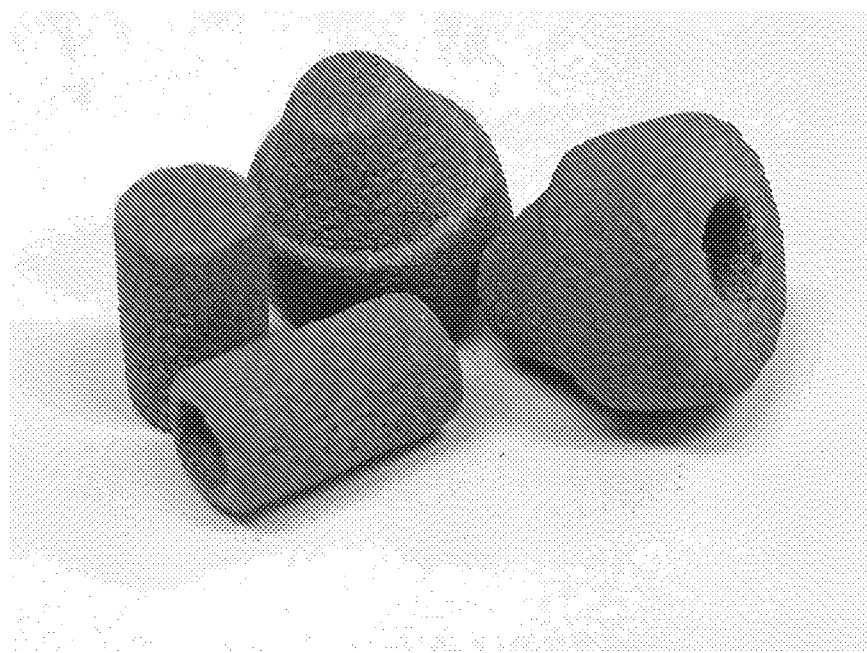
FIG. 13 is a photograph of the 3D printed parts of Example 4 after depowdering.
Figure 14:
FIG. 14 is a photograph of the 3D printed parts of Example 4 after curing (setting).

The parts were depowdered, and photographs of the depowdered parts are shown in FIG. 13. The cylinder parts were placed on steel shafts and cured (set) at 125° C. for 45 minutes. Photographs of the printed parts after curing are shown in FIG. 14.

Polishing Results

Mandrel tools of Example 1 as shown in FIG. 11 were provided for wet polishing of zirconia. Zirconia coupons with surfaces measuring 15 mm×20 mm were polished for approximately 30 seconds applying from 100 to 250 grams of force (go on the mandrel which was rotating at 15,000 rpm.

Each force condition was run on a separate zirconia coupon. During the time of applied force, the tool was moved in an even manner to affect an area measuring about 5 mm×5 mm.

Figure 15:
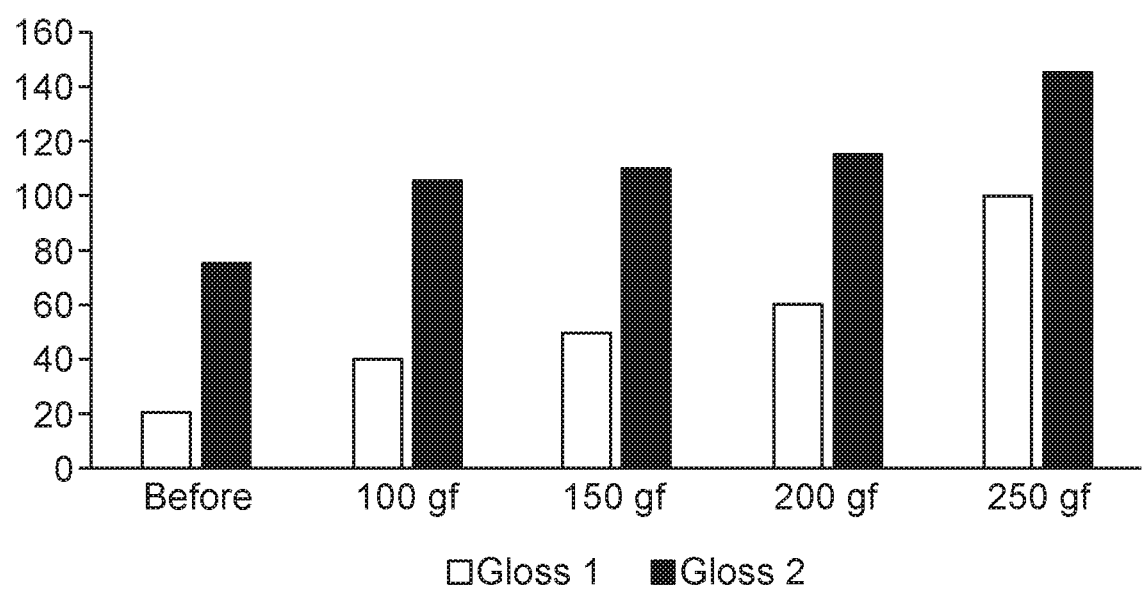
FIG. 15 is a plot summarizing the gloss measurements of surfaces polished with the 3D printed parts of Example 1 on steel mandrels.

After the polishing, the gloss of the samples was measured and is shown in FIG. 15. Sixty degree gloss GU (gloss units) was measured after polishing with a Novo-Curve gloss meter from Rhopoint Instruments (East Sussex, UK). The zirconia samples were measured for gloss in two perpendicular directions ("Gloss 1" and "Gloss 2"). The material loss for 200 and 250 gf was about 1 mg per minute, and for the other conditions the loss was below the measurable limit. During and after the polishing, the 3D polymer bond abrasive shape showed no cracking and no signs of separation from the mandrel.

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given to enable one of ordinary skill in the art to practice the claimed disclosure, is not to be construed as limiting the scope of the disclosure, which is defined by the claims and all equivalents thereto.

The invention claimed is:

1. A method of making an abrasive article, comprising:
    a) a subprocess, comprising:
        i) depositing a layer of loose powder particles in a confined region, wherein the loose powder particles comprise polymer bond precursor particles and abrasive particles, and wherein the layer of loose powder particles has substantially uniform thickness;
        ii) applying a liquid binder precursor material in predetermined regions of the layer of loose powder particles; and
        iii) converting the liquid binder precursor material into a temporary binder material, wherein the temporary binder material bonds to at least a portion of the polymer bond precursor particles and the abrasive particles in the predetermined regions to form a layer of bonded powder particles;
    b) independently carrying out step a) a plurality of times to generate an abrasive article preform comprising the bonded powder particles and remaining loose powder particles, wherein in each step a), the loose powder particles are independently selected and the liquid binder precursor material is independently selected; and
    c) converting the polymer bond precursor particles in the abrasive article preform into polymer bond particles, wherein the polymer bond particles retain the abrasive particles to form a polymer bond abrasive article, and wherein the liquid binder precursor material comprises a liquid carrier having a polymer dissolved or dispersed therein.

2. The method of claim 1, wherein the abrasive particles comprise at least one of diamond particles, cubic boron nitride particles, or metal oxide ceramic particles.

3. The method of claim 1, further comprising separating substantially all the remaining loose powder particles from the abrasive article preform prior to the converting step (c).

4. The method of claim 1, wherein the loose powder particles comprise submicron ceramic particles.

5. The method of claim 1, wherein the polymer bond precursor particles are chosen from urethane resins, epoxy resins, phenolic resins, and combinations thereof.

6. The method of claim 1, wherein the converting step (c) comprises heating the abrasive article preform to a temperature sufficient to at least partially soften the polymer bond precursor particles to form the polymer bond particles.

7. The method of claim 1, wherein the converting step (c) comprises heating the abrasive article preform to a temperature sufficient to polymerize the polymer bond precursor particles to form the polymer bond particles.

8. The method of claim 1, wherein the converting step (c) comprises heating a selected portion of the abrasive article preform to a temperature sufficient to at least partially soften the polymerize the polymer bond precursor particles to form the polymer bond particles.

9. The method of claim 1, wherein the abrasive article preform is heated to a temperature of about 150° C. to about 250° C.

10. The method of claim 1, wherein the converting step (c) comprises applying a polymerizing agent to the abrasive article preform to at least partially polymerize the polymer bond precursor particles to from polymer bond particles.

11. The method of claim 1, further comprising heating the loose powder particles prior to step (a)(ii).

12. A method of making an abrasive article, comprising:
a) a subprocess, comprising:
  i) depositing a layer of loose powder particles in a confined region, wherein the loose powder particles comprise polymer bond precursor particles and abrasive particles, and wherein the layer of loose powder particles has substantially uniform thickness;
  ii) applying a liquid binder precursor material in predetermined regions of the layer of loose powder particles; and
  iii) converting the liquid binder precursor material into a temporary binder material, wherein the temporary binder material bonds to at least a portion of the polymer bond precursor particles and the abrasive particles in the predetermined regions to form a layer of bonded powder particles;
b) independently carrying out step a) a plurality of times to generate an abrasive article preform comprising the bonded powder particles and remaining loose powder particles, wherein in each step a), the loose powder particles are independently selected and the liquid binder precursor material is independently selected; and
c) converting the polymer bond precursor particles in the abrasive article preform into polymer bond particles, wherein the polymer bond particles retain the abrasive particles to form a polymer bond abrasive article; and
wherein converting step (c) comprises heating a selected portion of the abrasive article preform to a temperature sufficient to at least partially soften the polymerize the polymer bond precursor particles to form the polymer bond particles.

13. The method of claim 12, wherein the liquid binder precursor material comprises a liquid carrier having a polymer dissolved or dispersed therein.

14. The method of claim 12, further comprising heating the loose powder particles prior to step (a)(ii).

15. A method of making an abrasive article, comprising:
a) a subprocess, comprising:
  i) depositing a layer of loose powder particles in a confined region, wherein the loose powder particles comprise polymer bond precursor particles and abrasive particles, and wherein the layer of loose powder particles has substantially uniform thickness;
  ii) heating the loose powder particles and applying a liquid binder precursor material in predetermined regions of the heated layer of loose powder particles; and
  iii) converting the liquid binder precursor material into a temporary binder material, wherein the temporary binder material bonds to at least a portion of the polymer bond precursor particles and the abrasive particles in the predetermined regions to form a layer of bonded powder particles;
b) independently carrying out step a) a plurality of times to generate an abrasive article preform comprising the bonded powder particles and remaining loose powder particles, wherein in each step a), the loose powder particles are independently selected and the liquid binder precursor material is independently selected; and
c) converting the polymer bond precursor particles in the abrasive article preform into polymer bond particles, wherein the polymer bond particles retain the abrasive particles to form a polymer bond abrasive article.

16. The method of claim 15, wherein the liquid binder precursor material comprises a liquid carrier having a polymer dissolved or dispersed therein.

17. The method of claim 15, wherein the converting step (c) comprises heating a selected portion of the abrasive article preform to a temperature sufficient to at least partially soften the polymerize the polymer bond precursor particles to form the polymer bond particles.

18. The method of claim 15, wherein the abrasive article preform is heated to a temperature of about 150° C. to about 250° C.

* * * * *